(12) United States Patent
Gehrmann

(10) Patent No.: US 11,218,319 B2
(45) Date of Patent: Jan. 4, 2022

(54) BIOMETRICS-BASED REMOTE LOGIN

(71) Applicant: Fingerprint Cards AB, Gothenburg (SE)

(72) Inventor: Christian Gehrmann, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 29 days.

(21) Appl. No.: 16/486,208

(22) PCT Filed: Feb. 13, 2018

(86) PCT No.: PCT/SE2018/050130
§ 371 (c)(1),
(2) Date: Aug. 15, 2019

(87) PCT Pub. No.: WO2018/156068
PCT Pub. Date: Aug. 30, 2018

(65) Prior Publication Data
US 2020/0007337 A1 Jan. 2, 2020

(30) Foreign Application Priority Data
Feb. 22, 2017 (SE) .................................. 1750188-3

(51) Int. Cl.
*H04L 9/32* (2006.01)
*H04L 9/06* (2006.01)
(Continued)

(52) U.S. Cl.
CPC .......... *H04L 9/3231* (2013.01); *H04L 9/0662* (2013.01); *H04L 9/0861* (2013.01); *H04L 9/0894* (2013.01); *H04L 9/3271* (2013.01); *H04L 63/0407* (2013.01); *H04L 63/0861* (2013.01)

(58) Field of Classification Search
CPC . H04L 9/32; H04L 9/3231; H04L 9/06; H04L 9/0662; H04L 9/08; H04L 9/0861; H04L 9/3271; H04L 9/0866; H04L 9/0869; H04L 9/0844; H04L 9/0847; H04L 63/04; H04L 63/0407; H04L 63/08; H04L 63/0861; H04L 63/12; G06F 21/32; G06F 21/30; G06F 21/31
See application file for complete search history.

(56) References Cited

U.S. PATENT DOCUMENTS 6,751,734 B1 * 6/2004 Uchida .................... G06F 21/32
713/186
10,313,317 B2 * 6/2019 O'Regan ............... H04L 9/0866
(Continued)

OTHER PUBLICATIONS

Chen, H. et al., "A hybrid scheme for securing fingerprint templates," Int. J. Inf. Secur. (2010) 9:353-361.
(Continued)

*Primary Examiner* — Kristine L Kincaid
*Assistant Examiner* — Shaqueal D Wade-Wright
(74) *Attorney, Agent, or Firm* — RMCK Law Group, PLC

(57) ABSTRACT

The invention relates to methods and devices for enabling authentication of a user based on biometric data. In an aspect of the invention, a method performed by a client device of enabling authentication of user of the client device with a network node over a secure communication channel based on biometric data is provided.

17 Claims, 5 Drawing Sheets

(51) Int. Cl.
*H04L 9/08* (2006.01)
*H04L 29/06* (2006.01)

(56) References Cited

U.S. PATENT DOCUMENTS

| | | | |
|---|---|---|---|
| 2007/0165847 A1* | 7/2007 | Langin-Hooper | H04L 9/0668 380/46 |
| 2010/0191967 A1* | 7/2010 | Fujii | H04L 63/0861 713/169 |
| 2011/0037563 A1* | 2/2011 | Choi | G06F 21/83 340/5.83 |
| 2015/0178515 A1* | 6/2015 | Cooley | G06F 21/31 713/155 |
| 2015/0381616 A1* | 12/2015 | Jo | H04L 9/3231 713/186 |
| 2016/0164682 A1 | 6/2016 | Hartloff et al. | |
| 2016/0171192 A1* | 6/2016 | Holz | G06F 21/32 726/19 |
| 2016/0191499 A1* | 6/2016 | Momchilov | G06F 21/62 713/171 |
| 2018/0247049 A1* | 8/2018 | Fang | H04L 9/32 |

OTHER PUBLICATIONS

Dang, T. et al., "Cancellable fuzzy vault with periodic transformation for biometric template protection," IET Biometrics, vol. 5, Issue 3, 2016, pp. 229-235.

Nandakumar, K. et al., "Fingerprint-Based Fuzzy Vault: Implementation and Performance," IEEE Transactions On Information Forensics and Security, vol. 2, No. 4, Dec. 2007, pp. 744-757.

PCT International Search Report and Written Opinion dated Jun. 1, 2018 for International Application No. PCT/SE2018/050130, 12 pages.

Tams, B. et al., "Towards Efficient Privacy-Preserving Two-Stage Identification for Fingerprint-based Biometric Cryptosystems," IEEE International Joint Conference on Biometrics, Sep. 29, 2014, p. 1-8.

EP Extended Search Report dated Nov. 25, 2020 for EP Application No. 18756688.0, 6 pages.

Nandakumar, K. et al., "BioSAKE: Biometrics-based Secure Authentication and Key Exchange," 2013 International Conference on Biometrics (ICB), IEEE, Jun. 4, 2013, 8 pages.

Rathgeb, C. et al., "A survey on biometric cryptosystems and cancelable biometrics," EURASIP Journal on Information Security, vol. 2011, No. 1, Jan. 1, 2011, 25 pages.

* cited by examiner

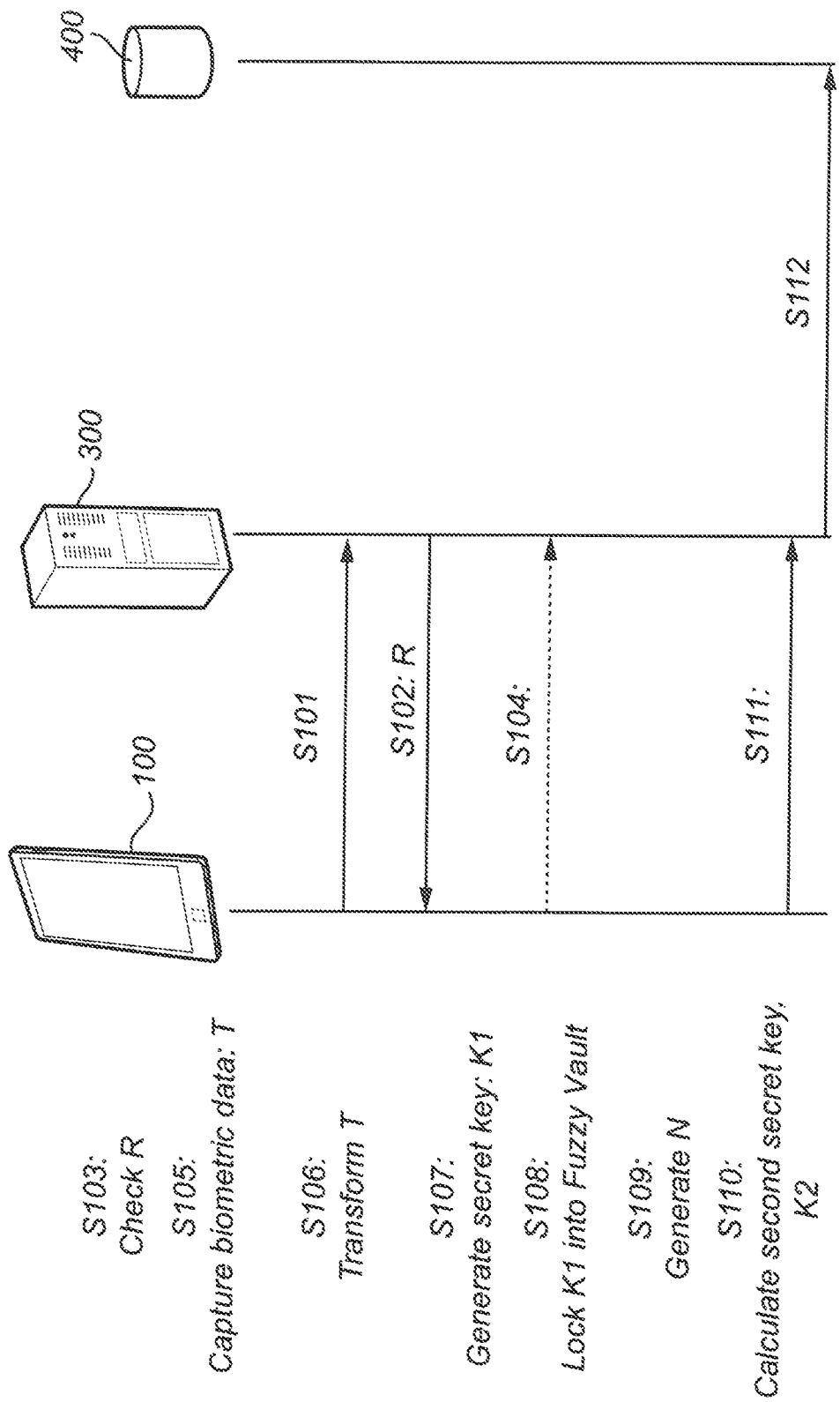

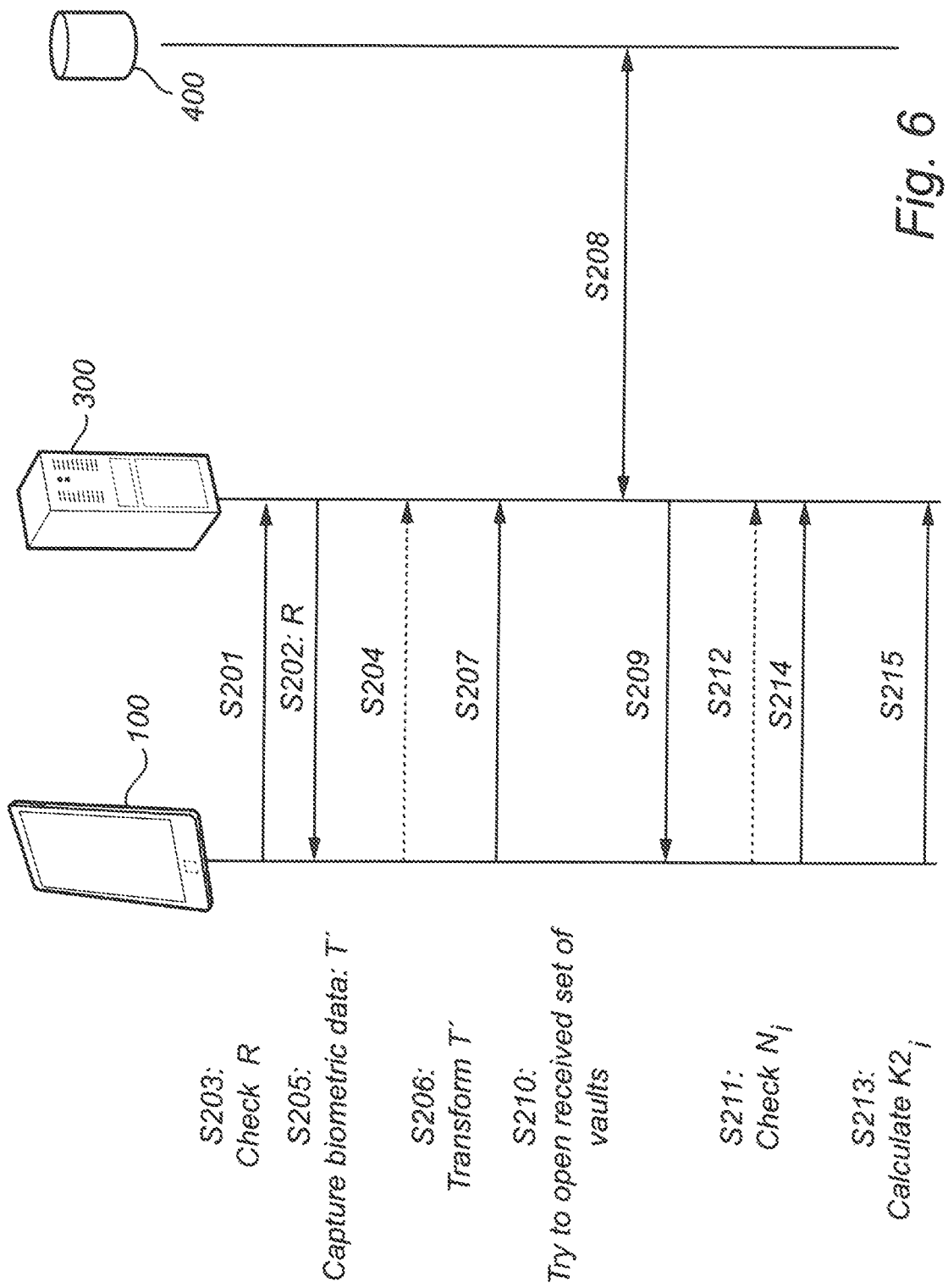

BIOMETRICS-BASED REMOTE LOGIN

CROSS-REFERENCE TO RELATED APPLICATIONS

This application is a 371 U.S. National Stage of International Application No. PCT/SE2018/050130, filed Feb. 13, 2018, which claims priority to Swedish Patent Application No. 1750188-3, filed Feb. 22, 2017. The disclosures of each of the above applications are incorporated herein by reference in their entirety.

TECHNICAL FIELD

The invention relates to methods and devices of enabling authentication of a user of a client device over a secure communication channel based on biometric data.

BACKGROUND

Biometrics-based identification is a user-friendly way to securely authenticate human users. One major problem with biometric data when using it for identification purposes in distributed systems is that template biometric data must be available at a node in a computer system where the end-user is supposed to be identified. This constitute a major security design challenge in distributed computer system as this typically requires original, clear text biometric data to be stored at a central node and distributed in the system. Such solutions are very vulnerable to original biometric data compromise, and data compromised on one system may lead to a situation that the same biometric data is compromised on all other systems as well where the biometric data is used. Simply encrypting the biometric data will not solve this problem as the original biometric data must be available at the remote location during authentication.

Hence, there is a need to provide solutions that allow remote authentication based on biometric identification but at the same time provide protection of the original biometric data.

SUMMARY

An object of the present invention is to solve, or at least mitigate, this problem in the art and thus to provide an improved method of enabling authentication of a user of a client device over a secure communication channel based on biometric data.

This object is attained in a first aspect of the invention by a method performed by a network node of enabling authentication of a user of a client device over a secure communication channel based on biometric data. The method comprises receiving a request from the client device to enrol the biometric data of the user captured at the client device, and receiving, from the client device, transformed biometric data, a fuzzy vault containing a client-generated first secret key, the vault being locked using the biometric data of the user, a client-generated second secret key and a client-generated secret random number from which the second secret key is generated in combination with the first secret key.

This object is attained in a second aspect of the invention by a network node configured to enable authentication of a user of a client device over a secure communication channel based on biometric data, the trusted network node comprising a processing unit being configured to, receive a request from the client device to enrol the biometric data of the user captured at the client device, and receive, from the client device, transformed biometric data, a fuzzy vault containing a client-generated first secret key, the vault being locked using the biometric data of the user, a client-generated second secret key and a client-generated secret random number from which the second secret key is generated in combination with the first secret key.

This object is attained in a third aspect of the invention by a method performed by a client device of enabling authentication of user of the client device with a network node over a secure communication channel based on biometric data. The method comprises submitting a request to the network node to enrol the biometric data of the user captured at the client device, capturing the biometric data of the user, transforming the biometric data into non-invertible biometric data, generating a first secret key, and creating a fuzzy vault containing the first secret key, the vault being locked using the biometric data of the user. The method further comprises generating a secret random number, creating a second secret key based on the first secret key and the secret random number, and submitting, to the network node, the transformed biometric data, the fuzzy vault, the second secret key and the secret random number.

This object is attained in a fourth aspect of the invention by a client device configured to enable authentication of user of the client device with a network node over a secure communication channel based on biometric data, the client device comprising a biometric data sensing system comprising a biometric data sensor and a processing unit. The processing unit is configured to submit a request to the network node to enrol the biometric data of the user captured at the client device, The biometric data sensor is configured to capture the biometric data of the user. The processing unit is further configured to transform the biometric data into non-invertible biometric data, generate a first secret key, create a fuzzy vault containing the first secret key, the vault being locked using the biometric data of the user, generate a secret random number, create a second secret key based on the first secret key and the secret random number, and submit, to the network node, the transformed biometric data, the fuzzy vault, the second secret key and the secret random number.

In an implementation, a user may subscribe to a service provided by a remote server, such as an e-commerce service with which the user authenticates herself using fingerprint data instead of a Personal Identification Number (PIN) for instance to effect a payment of goods bought via the e-commerce service. The user will initially have to perform an enrolment procedure with the remote server over a secure channel.

The client device submits a request to the remote server 300, over a secure channel e.g. via the Internet, to which request the remote server in an embodiment replies by sending a feature transformation key which will be used by the client device to transform captured biometric data into a transformed biometric data set, using a suitable feature transform scheme.

The transform scheme used should produce transformed biometric data which is non-invertible, i.e. it should be infeasible for an attacker to reconstruct the original biometric data even with access to both the feature transformation key and the transformed biometric data.

In an alternative embodiment, it is envisaged that the client device and the remote server utilizes a secret pre-agreed transform to perform the transformation of the captured biometric data, resulting in the transformed biometric data. In such an embodiment, the feature transformation key would not be required, so the remote server would in this alternative embodiment not send the feature transformation key to the client device. Instead, the client device would use the shared transform (which is held a secret between the client device and the remote server) to transform the biometric data.

However, in the following, the embodiment using the feature transformation key will be discussed.

The client device generates a first secret key which is contained in a so called fuzzy vault V using the biometric data and applying an appropriate fuzzy vault scheme. A fuzzy vault is a cryptographic construction in which a secret can be locked in by using a set of data A—in this particular invention a biometric data set—and the fuzzy vault can only be unlocked by a set of data B only if set B is similar to set A.

Further, the client device generates a random number and creates a second secret key using the secret first key and the secret random number, for instance by using a pseudorandom function.

The client device then submits an enrollment set comprising the fuzzy vault, the transformed biometric data, the second secret key and the secret random number over the secure channel to the remote server along with any user data, such as e.g. the user's billing address.

The remote server stores the data received in an end-user database, located either locally at or remote from the remote server.

Advantageously, by using the fuzzy vault, enrolment of the user has been facilitated without having to store the biometric data in the clear outside of the user's trusted client device.

In an embodiment, when the user wishes to authenticate herself with the remote server for accessing the provided service with which she has enrolled, either on the client device with which the enrollment procedure was undertaken or another, second client device, the second client device will submit a request for authentication to the remote server over a secure channel.

Again, the remote server will reply by sending the feature transformation key, which is used by the second client device to transform biometric data captured at the second client device. Alternatively, the biometric data is transformed using the secret transform shared between the enrolling client device and the remote server, which hence further must be shared with any further client device desiring to perform an authentication with the remote server 00.

The second client device thus transforms the captured biometric data using the feature transformation key, resulting in the transformed biometric data, and submits the transformed biometric data to the remote server which uses the transformed biometric data to fetch one or more matching enrollment sets from the end-user database.

The remote server derives (one or more) candidate sets comprising the fuzzy vault and the random number from (one or more) fetched enrollment set(s) and sends the derived candidate set(s) to the second client device.

Now, if the biometric data captured at the second device matches those initially captured by the enrolling client device and used during the enrollment phase, the second client device will be capable of unlocking the fuzzy vault and acquiring the first secret key.

The acquired first secret key is then used together with the received secret random number to generate the second secret key K2.

The user of the second client device will finally be authenticated at the remote server by proving knowledge of the previously enrolled second secret key.

This may be performed by engaging in a mutual authentication process with the remote server. For instance, a Transport Layer Security pre-shared key (TLS-PSK) cryptographic protocol may be utilized, which is based on symmetric keys shared in advance among the communicating parties, in this case the remote server and the second client device.

Advantageously, with this embodiment of the invention, the user has been authenticated by the remote server without the biometric data having being made available in clear text to the remote server.

Further embodiments of the invention will be set forth in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 illustrates an embodiment of performing enrollment of biometric data of a user with a remote server; and FIG. 6 illustrates an embodiment of authentication a user of a client device at a remote server.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
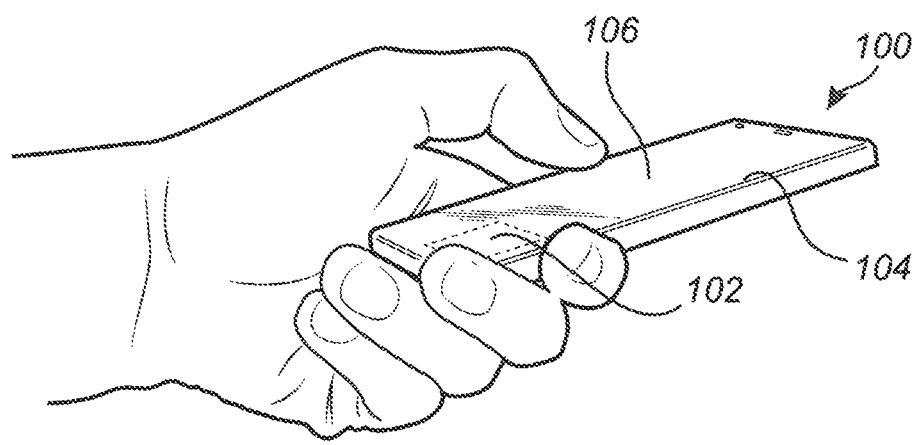
FIG. 1 shows an electronic device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
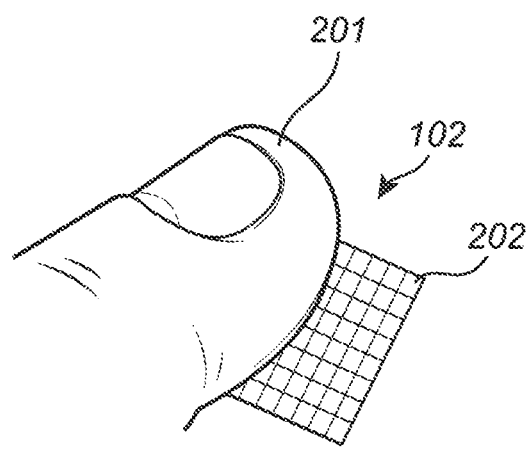
FIG. 2 shows a view of a fingerprint sensor onto which a user places her finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
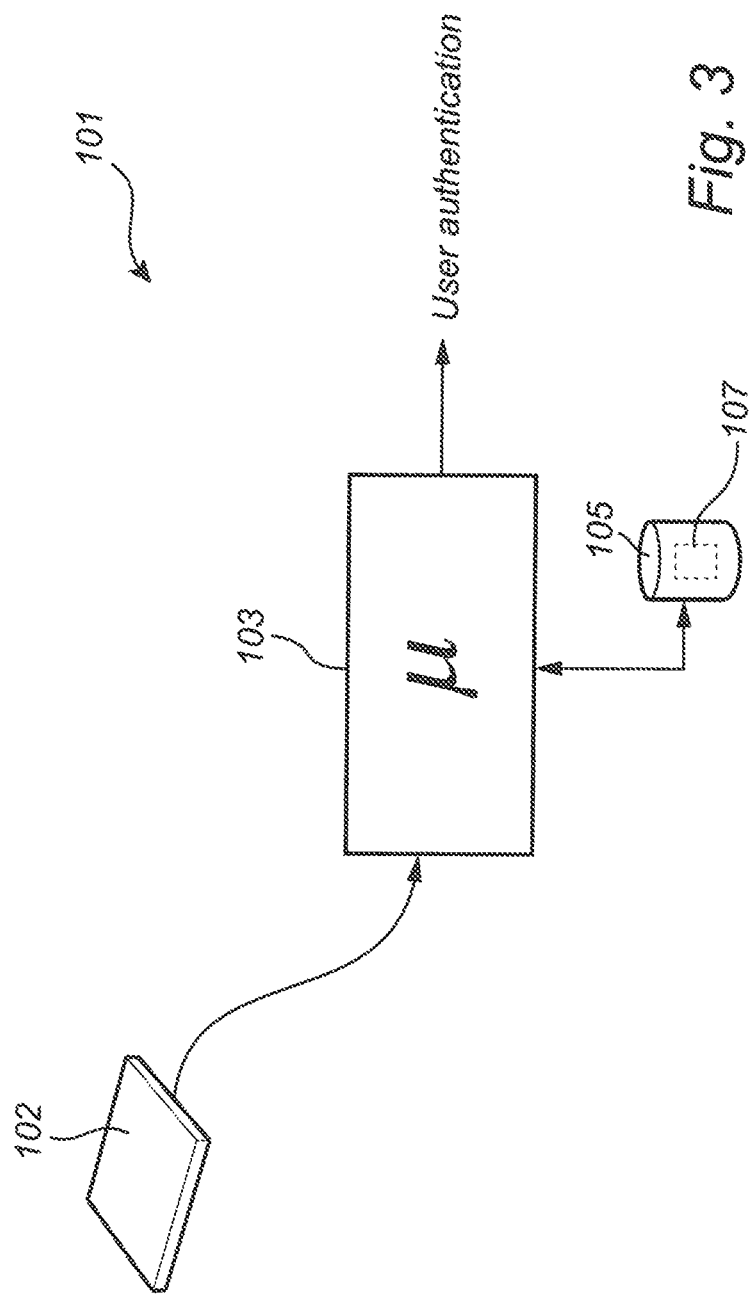
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
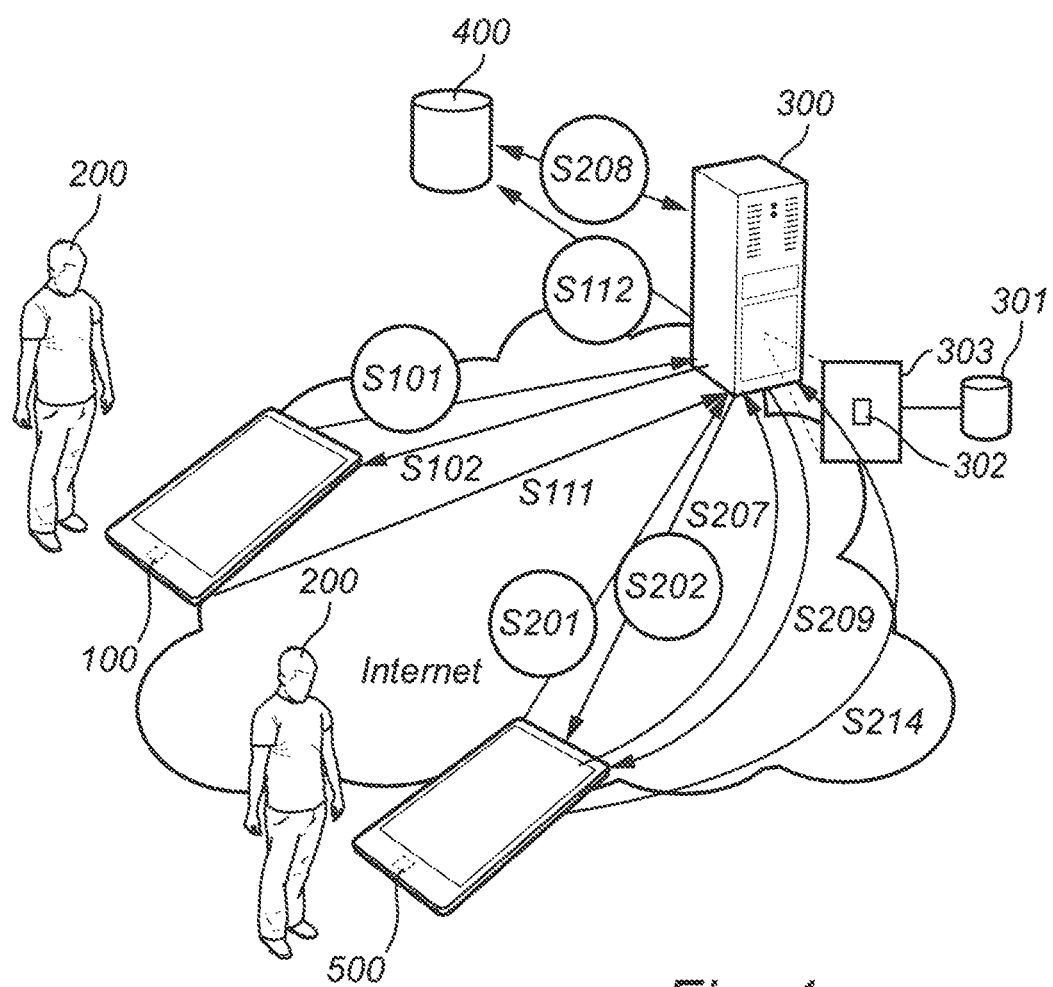
FIG. 4 illustrates an embodiment of enabling authentication of user of a client device over a secure communication channel based on biometric data.

FIG. 4 illustrates an embodiment of enabling authentication of user of a client device over a secure communication channel based on biometric data.

Hence, the client device 100 captures biometric data T of the user 200, e.g. in the manner described with reference to FIGS. 1-3.

Assuming for instance that the user 200 subscribes to a service provided by remote server 300, such as an e-commerce service with which the user 200 authenticates herself using fingerprint data instead of a Personal Identification Number (PIN) to effect a payment of goods bought via the e-commerce service. The user 200 will initially have to perform an enrolment procedure with the remote server 300 over a secure channel.

The client device 100 submits in step S101 a request to the remote server 300, over a secure channel e.g. via the Internet, to which request the remote server 300 in step S102 in an embodiment replies by sending a feature transformation key R which will be used by the client device 100 to transform the captured biometric data T into a transformed biometric data set TP, using a suitable feature transform scheme. The transform scheme used should produce transformed biometric data TP which is non-invertible, i.e. it should be infeasible for an attacker to reconstruct the original biometric data T even with access to both the feature transformation key R and the transformed biometric data TP.

In an alternative embodiment, it is envisaged that the client device 100 and the remote server 300 utilizes a secret pre-agreed transform to perform the transformation of the captured biometric data T, resulting in the transformed biometric data TP. In such an embodiment, the feature transformation key R would not be required. However, in the following, the embodiment using the feature transformation key R will be illustrated.

The client device 100 generates a first secret key K1 which is contained in a so called fuzzy vault V, using the biometric data and applying a fuzzy vault scheme such as for instance that presented in D. Juels and M. Sudan, "A fuzzy vault scheme", Des. Codes Cryptography, Vol. 38, No. 2, pp. 237-257, 2006.

A fuzzy vault is a cryptographic construction in which a secret can be locked in by using a set of data A—in this particular invention a biometric data set—and the fuzzy vault can only be unlocked by a set of data B only if set B is similar to set A.

The fuzzy vault will be denoted V=U(T, K1), meaning that the fuzzy vault V is created by locking the K1 into the vault by means of a fuzzy vault scheme U by using the biometric data T as the data set locking the vault.

Further, the client device 100 generates a random number N and creates a second secret key K2 using the secret first key K1 and the secret random number N, for instance by using a pseudorandom function denoted K2=PRF(K1, N).

The client device 100 then submits in step S111 the fuzzy vault V, the transformed biometric data TP, the second secret key K2 and the secret random number N over the secure channel to the remote server 300 along with any user data, such as e.g. the user's billing address. The data set {TP, V, K2, N} will in the following be referred to as the enrollment set.

In step S112, the remote server 300 stores the data received in step S111 in an end-user database 400, located either locally at or remote from the remote server 300.

Advantageously, by using the fuzzy vault V, the biometric data is not stored in the clear outside of the user's trusted client device 100.

Now, when the user 200 wishes to authenticate herself with the remote server 300 for accessing the provided service with which she has enrolled, either on the client device 100 with which the enrollment procedure was undertaken or a second client device 500, the second client device 500 will submit a request for authentication in step S201 to the remote server 300 over a secure channel.

Again, the remote server 300 will reply in step S202 by sending the feature transformation key R, which is used by the second client device 500 to transform biometric data T' captured at the second client device 500. Alternatively, the biometric data T' is transformed using the secret transform shared between the client device 100 and the remote server 300, which hence further must be shared with any further client device desiring to perform an authentication with the remote server 300.

The second client device 500 thus transforms the captured biometric data T' using the feature transformation key R, resulting in the transformed biometric data TP', and submits the transformed biometric data TP' in step S207 to the remote server 300 which uses the transformed biometric data TP' to fetch one or more matching enrollment sets from the end-user database 400 in step S208.

The remote server 300 derives (one or more) candidate set(s) {V, N} from the (one or more) fetched enrollment set(s) {TP, V, K2, N}, and sends the derived candidate set(s) {V, N} to the second client device 500 in step S209.

Now, if the biometric data captured at the second device matches those initially captured by the client device 100 and used during the enrollment phase, the second client device 500 will be capable of unlocking the fuzzy vault V and acquiring the first secret key K1.

The acquired first secret key K1 is then used together with the received secret random number N to generate the second secret key K2:K2=PRF(K1, N).

The user of the second client device 500 will finally be authenticated at the remote server 300 by proving knowledge of the previously enrolled second secret key K2 in step S214. This may be performed by engaging in a mutual authentication process with the remote server 300. For instance, a shared secret (such as N) may be encrypted on one side and decrypted on the other side using the symmetric second secret key K2 for both operations. If the decryption is successful, the encrypting party is considered successfully authenticated.

Even more preferred is to use a Transport Layer Security pre-shared key (TLS-PSK) cryptographic protocol, which is based on symmetric keys shared in advance among the communicating parties, in this case the remote server 300 and the second client device 500.

Advantageously, with the embodiment of the invention illustrated with reference to FIG. 4, the user 200 has been authenticated by the remote server 300 without the biometric data being made available in clear text to the remote server 300 itself.

With reference to FIG. 4, the steps of the method performed by the remote server 300 are in practice performed by a processing unit 301 embodied in the form of one or more microprocessors arranged to execute a computer program 302 downloaded to a storage medium 303 associated with the microprocessor, such as a Random Access Memory (RAM), a Flash memory or a hard disk drive. The processing unit 301 is arranged to cause the remote server 300 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

FIG. 5 illustrates a more detailed embodiment of performing enrollment of biometric data of a user with the remote server 300 in order to subsequently enable authentication of the user via a client device capturing biometric data of the user, for instance by means of fingerprint sensing as previously discussed with reference to FIGS. 1-3.

Hence, a secure communication channel is established between the client device 100 and the remote server 300; i.e. a communication channel being protected in terms of confidentiality and integrity.

In step S101, the client device 100 makes a request on behalf of the user 200 of the client device 100 to enroll the user 200 to the service provided by a remote system where the remote server 300 handles the authentication.

In reply to the request, the remote server 300 submits in step S102, a feature transformation key R enabling the client device 100 to transform the biometric data into non-invertible biometric data. The key R may be created from a generated random number. The feature transformation key R is used to transform biometric data for all users handled by the remote server 300 in the system.

In an embodiment, the client device 100 performs a randomness test (using any appropriate statistical analysis algorithm) on the received feature transformation key R in step S103 and indicates to the remote server 300 in step S104 with an error message if the key fails to pass the randomness test, i.e. if the key does not present truly random properties, in which case the enrollment process is terminated, either by the client device 100 or the remote server 300. Advantageously, a situation can be avoided where a hostile remote server sends feature transform keys not having random properties would make the used transform more vulnerable to attacks.

Again, in an alternative embodiment, it is envisaged that the client device 100 and the remote server 300 utilizes a secret pre-agreed transform to perform the transformation of the captured biometric data T. In such an embodiment, the feature transformation key R would not be required.

In this particular exemplifying embodiment, the feature transformation key R is assumed to pass the randomness test in step S103, so the client device 100 proceeds with capturing the biometric data T of the user in step S105, for instance by means of utilizing fingerprint sensing, even if the capturing of the biometric data T could be performed even before the request for enrolment is made.

The client device 100 uses to the received feature transformation key R to perform a non-invertible transformation F(T, R) of the biometric data T in step S106, resulting in the non-invertible transformed biometric data TP, i.e. TP=F(T, R). It is understood that the transform function F to be used is system defined. Alternatively, the biometric data T is transformed at the client device 100 in step S106 using a secret pre-agreed transform.

A number of different transform functions F may be envisaged, such as cartesian, polar or functional transformations, or a non-invertible transformation function built upon an approximation Message Authentication Code (MAC) scheme.

The client device 100 proceeds to generating a first secret key K1 using e.g. a random number generator in step S107, and further a so called fuzzy vault V:V=U(T, K1) in Step S108, which vault V contains the first secret K1 and is locked by the biometric data T of the user 200. In particular, the function U might be determined by a probabilistic deterministic algorithm.

Further, the client device 100 generates a random number N in step S109 and calculates a second secret key K2 by processing the first secret key K1 and the random number N in a pseudorandom function; K2=PRF(K1, N) in step S110.

Finally, the client device 100 submits in step S111, over the established secure channel, the enrollment set {TP, V, K2, N} to the remote server 300 along with any appropriate user data, such as e.g. the user's billing address, personal profile information, credit card information, etc.

The remote server 300 stores the received enrollment set in the secure end-user database 400 in step S112.

FIG. 6 illustrates a more detailed embodiment of performing authentication of the user 200 with the remote server 300 based on biometric data in order to, for instance, allow the user 200 to make a purchase with an e-commerce service provided by the remote server 300 via the client device 100 that performed the enrollment as was discussed with reference to FIG. 5, or by a different client device, such as the second client device 500.

Again, a secure communication channel is established between the client device 100 and the remote server 300; i.e. a communication channel being protected in terms of confidentiality and integrity.

In step S201, the client device 100 makes a request on behalf of the user 200 of the client device 100 to authenticate the user 200 at the remote server 300 which handles the authentication to the service provided by the system.

In reply to the request, the remote server 300 submits in step S202, a feature transformation key R enabling the client device 100 to transform the biometric data into non-invertible biometric data. The key R may be created from a generated random number. The feature transformation key R is used to transform biometric data for all users handled by the remote server 300 in the system. Alternatively, the biometric data is transformed at the client device 100 using a secret pre-agreed transform, in which the feature transformation key R is not required.

In an embodiment, as previously described, the client device 100 performs a randomness test (using any appropriate statistical analysis algorithm) on the received feature transformation key R in step S203 and indicates to the remote server 300 in step S204 with an error message if the key fails to pass the randomness test, i.e. if the key does not present truly random properties, in which case the enrollment process is terminated, either by the client device 100 or the remote server 300. Advantageously, a situation can be avoided where a hostile remote server sends feature transform keys not having random properties would make the used transform more vulnerable to attacks.

In this particular exemplifying embodiment, the feature transformation key R is assumed to pass the randomness test in step S203, so the client device 100 proceeds with capturing the biometric data T' of the user in step S205, for instance by means of utilizing fingerprint sensing, even if the capturing of the biometric data T' could be performed even before the request for authentication is made.

As previously mentioned, in an alternative embodiment, a secret pre-agreed transform is utilized to perform the transformation, in which case the feature transformation key R is not required.

The client device 100 uses to the received feature transformation key R to perform a non-invertible transformation F(T', R) of the biometric data T' in step S206, resulting in the non-invertible transformed biometric data TP', i.e. TP=F(T', R). It is understood that the transform function F to be used is system defined.

Again, a number of different transform functions F may be envisaged, such as cartesian, polar or functional transformations, or a non-invertible transformation function built upon an approximation MAC scheme.

The client device 100 submits the transformed biometric data TP' in step S207 to the remote server 300 which uses the transformed biometric data TP' to fetch one or more matching enrollment sets {TP, V, K2, N} from the end-user database 400 in step S208, where TP' matches TP.

The remote server 300 uses a suitable matching algorithm to search the end-user database for stored transformed biometric data sets that matches the received transformed biometric data set TP'. This can for instance be a hash tree-based search in combination with a distance matching metrics function such as a Hamming distance based metric or a Euclidian based metrics. The exact matching function used will depend on the chosen particular feature transform used in the system.

The remote server 30*o* derives one or more matching candidate sets {V, N}=({$V_0, N_0$}, . . . {$V_1, N_1$}, . . . , ($V_{k-1}$, $N_{k-1}$)} and sends the derived candidate sets to the client device 100 in step S209.

The client device 100 will try to open each of the fuzzy vaults $V_0, V_1, V_{k-1}$ using the captured biometric data T' in step S210. It is in this example assumed that the client device 100 succeeds in opening fuzzy vault $V_i$ and access the first secret key contained in the vault with index i. That is, $K1_i$=UI(T', $V_i$), where UI denotes a vault opening function corresponding to the vault locking function U of the enrollment phase.

In an embodiment, as previously was undertaken for the feature transform key R, the client device 100 performs a randomness test (using any appropriate statistical analysis algorithm) on the received random number $N_i$ in step S211 and indicates to the remote server 300 in step S212 with an error message if the key fails to pass the randomness test, i.e. if the key does not present truly random properties, in which case the authentication process is terminated, either by the client device 100 or the remote server 300. Advantageously, a situation can be avoided where a hostile remote server sends feature transform keys not having random properties would make the used feature transform key more vulnerable to attacks.

In this particular exemplifying embodiment, the random number $N_i$ is assumed to pass the randomness test in step S211.

Now, since the biometric data T' captured at the client device wo matches those initially captured by the client device 100 and enrolled with the remote server 300 during the enrollment phase, the client device 100 is capable of unlocking the fuzzy vault $V_i$ and acquire the first secret key $K1_i$.

The acquired first secret key K1*i* is then used together with the received secret random number $N_i$ in step S213 to generate the second secret key $K2_i$: $K2_i=PRF(K1_i, N_i)$.

The user of the client device 100 will finally be authenticated at the remote server 300 by proving knowledge of the previously enrolled second secret key K2 in step S214. This may be performed by submitting the index i, thereby indicating to the remote server 300 the second secret key $K2_i$ corresponding to the first secret key $K1_i$ contained in the unlocked vault $V_i$.

This may be even further strengthened in an embodiment by the client device 100 and the remote server 300 engaging in a mutual authentication process in step S215, using for instance pre-shared key Transport Layer Security (TLS), whereby the user 200 of the client device 100 is authenticated by the remote server 300.

The invention can be used in a large number of remote biometrics identification use cases where a user would like to login in to a service. Advantageously, with the solution of the invention the user 200 is both identified, using biometric information and authenticated using the biometric data crypto system utilizing a fuzzy vault scheme. This means that the user can login to a remote Web service offering the login procedure according to the invention by presenting her biometric information with an arbitrary (trusted) device supporting the remote authentication procedure. Hence, there is no need for the user to remember any username and/or password or any requirement to carry a certain hardware token, or having a special purpose identification program or credentials stored on the client device used for the login. Further, in an embodiment, mutual authentication is applied between the remote server 300 and the client device 100, i.e. it can also be used for applications where it is important for the client device to make sure it connects to the correct server.

Advantageously, no clear text biometric data is stored at the remote server, which considerable can increase a user's trust in using the system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of enabling authentication of a user of a client device over a secure communication channel based on biometric data, comprising:
   receiving a request from the client device to enroll the biometric data of the user captured at the client device;
   receiving, from the client device, transformed biometric data, the biometric data having been transformed into non-invertible biometric data, a fuzzy vault containing a client-generated first secret key, the vault being locked using the biometric data of the user, a client-generated second secret key and a client-generated secret random number from which the second secret key is generated in combination with the first secret key;
   receiving a request from the client device to authenticate the user;
   receiving, from the client device, transformed biometric data;
   acquiring at least one data set which matches the transformed biometric data, said at least one data set comprising a client-generated secret random number, a client-generated second secret key, and a fuzzy vault containing a client-generated first secret key;
   submitting, to the client device, the fuzzy vault and the secret random number of said at least one data set; and
   receiving, from the client device, an indication that the client device proves knowledge of the second secret key, in which case the client device was capable of unlocking the fuzzy vault using the captured biometric data and using the first secret key and the secret random number to create the second secret key, wherein the user of the client device is authenticated.

2. The method of claim 1, further comprising:
   submitting, to the client device, a feature transformation key enabling the client device to transform the biometric data into non-invertible biometric data.

3. The method of claim 2, further comprising:
   receiving an indication from the client device that the feature transformation key failed to pass a randomness test, wherein the enrollment of the biometric data is terminated.

4. The method of claim 1, wherein the second secret key is generated by processing the first secret key and the secret random number in a pseudorandom function.

5. The method of claim 1, further comprising:
   storing the received transformed biometric data, fuzzy vault, second secret key and secret random number in a secure end-user database.

6. The method of claim 1, further comprising:
   submitting, to the client device, a feature transformation key enabling the client device to transform biometric data into non-invertible biometric data, wherein the received transformed biometric data has been transformed using the received feature transformation key.

7. The method of claim 1, further comprising:
   receiving an indication from the client device that the secret random number failed to pass a randomness test, wherein the authentication of the user of the client device is terminated.

8. A method performed by a client device of enabling authentication of user of the client device with a network node over a secure communication channel based on biometric data, comprising:
   submitting a request to the network node to enroll the biometric data of the user captured at the client device;
   capturing the biometric data of the user;
   transforming the biometric data into non-invertible biometric data;
   generating a first secret key;
   creating a fuzzy vault containing the first secret key, the vault being locked using the biometric data of the user;
   generating a secret random number;
   creating a second secret key based on the first secret key and the secret random number;
   submitting, to the network node, the transformed biometric data, the fuzzy vault, the second secret key and the secret random number;

submitting a request to the network node to authenticate the user;
capturing the biometric data of the user;
transforming the biometric data into non-invertible biometric data;
submitting, to the network node, the biometric data transformed with a feature transformation key;
receiving, from the network node, at least one fuzzy vault and an associated secret random number;
attempting to unlock the received at least one fuzzy vault using the captured biometric data;
creating a second secret key based on the first secret key and the associated secret random number of the at least one fuzzy vault successfully unlocked; and
submitting, to the network node, an indication that the client device proves knowledge of the second secret key, wherein the user of the client device is authenticated.

9. The method of claim 8, further comprising:
receiving, from the network node, the feature transformation key; wherein the transforming of the biometric data into non-invertible biometric data is performed using the received feature transformation key.

10. The method of claim 9, further comprising:
performing a randomness test on the received feature transformation key;
submitting an indication to the network node that the feature transformation key failed to pass the randomness test, wherein the authentication of the user is terminated.

11. The method of claim 8, further comprising:
performing a randomness test on the at least one received secret random number;
submitting an indication to the network node that the at least one received associated random number failed to pass the randomness test, wherein the authentication of the user is terminated.

12. The method of claim 8, further comprising:
performing mutual authentication with the network node using the second secret key.

13. The method of claim 8, further comprising:
performing mutual authentication with the network node using a Transport Layer Security pre-shared key, TLS-PSK, protocol.

14. The method of claim 8, wherein the biometric data is transformed at the client device using a secret pre-agreed transform between the client device and the network node.

15. A network node configured to enable authentication of a user of a client device over a secure communication channel based on biometric data, the trusted network node comprising a processing unit being configured to:
receive a request from the client device to enroll the biometric data of the user captured at the client device; and
receive, from the client device, transformed biometric data, the biometric data having been transformed into non-invertible biometric data, a fuzzy vault containing a client-generated first secret key, the vault being locked using the biometric data of the user, a client-generated second secret key and a client-generated secret random number from which the second secret key is generated in combination with the first secret key;
receive a request from the client device to authenticate the user;
receive, from the client device, transformed biometric data;
acquire at least one data set which matches the transformed biometric data, said at least one data set comprising a client-generated secret random number, a client-generated second secret key, and a fuzzy vault containing a client-generated first secret key;
submit, to the client device, the fuzzy vault and the secret random number of said at least one data set; and
receive, from the client device, an indication that the client device proves knowledge of the second secret key, in which case the client device was capable of unlocking the fuzzy vault using the captured biometric data and using the first secret key and the secret random number to create the second secret key, wherein the user of the client device is authenticated.

16. A client device configured to enable authentication of user of the client device with a network node over a secure communication channel based on biometric data, the client device comprising a biometric data sensing system comprising a biometric data sensor and a processing unit,
the processing unit being configured to:
submit a request to the network node to enroll the biometric data of the user captured at the client device;
the biometric data sensor being configured to:
capture the biometric data of the user;
the processing unit further being configured to:
transform the biometric data into non-invertible biometric data;
generate a first secret key;
create a fuzzy vault containing the first secret key, the vault being locked using the biometric data of the user;
generate a secret random number;
create a second secret key based on the first secret key and the secret random number;
submit, to the network node, the transformed biometric data, the fuzzy vault, the second secret key and the secret random number;
submit a request to the network node to authenticate the user;
capture the biometric data of the user;
transform the biometric data into non-invertible biometric data;
submit, to the network node, the biometric data transformed with a feature transformation key;
receive, from the network node, at least one fuzzy vault and an associated secret random number;
attempt to unlock the received at least one fuzzy vault using the captured biometric data;
create a second secret key based on the first secret key and the associated secret random number of the at least one fuzzy vault successfully unlocked; and
submit, to the network node, an indication that the client device proves knowledge of the second secret key, wherein the user of the client device is authenticated.

17. A computer program product comprising a non-transitory computer readable medium, the non-transitory computer readable medium having a computer program embodied thereon comprising computer-executable instructions for causing a trusted network node to perform the method of claim 1 when the computer-executable instructions are executed on a processing unit included in the network node.

* * * * *